United States Patent [19]

Hansson

[11] Patent Number: 5,353,853
[45] Date of Patent: Oct. 11, 1994

[54] SUPPORTING WHEEL

[75] Inventor: Hans-Erik Hansson, FinspÅng, Sweden

[73] Assignee: He Hansson Aktiebolag, Finspang, Sweden

[21] Appl. No.: 956,494

[22] PCT Filed: Jun. 25, 1991

[86] PCT No.: PCT/SE91/00457
§ 371 Date: Jan. 5, 1993
§ 102(e) Date: Jan. 5, 1993

[87] PCT Pub. No.: WO92/00858
PCT Pub. Date: Jan. 23, 1992

[30] Foreign Application Priority Data

Jul. 10, 1990 [SE] Sweden .................. 9002405-0

[51] Int. Cl.$^5$ ............................................. B60C 7/10
[52] U.S. Cl. ............................................. 152/11; 152/5
[58] Field of Search .................... 152/1, 5, 7, 11, 12

[56] References Cited

U.S. PATENT DOCUMENTS 4,350,196  9/1982  Hampshire .................. 152/5

FOREIGN PATENT DOCUMENTS 349089  5/1905  France ........................ 152/11
8705267  9/1987  World Int. Prop. O. ........ 152/5

Primary Examiner—Russell D. Stormer
Attorney, Agent, or Firm—Keck, Mahin & Cate

[57] ABSTRACT

A non-pneumatic supporting wheel includes a central part and a wheel-rim which is supported by the central part. The wheel-rim has an outer wheel-rim part which is intended to roll against an underlying surface, and an inner wheel-rim part which is located radially inwards of the outer wheel-rim part. At least the inner of the two wheel-rim parts is constructed from a plurality of curved, elongated elements which consist of a resilient material and which are spaced in the circumferential direction of the wheel. When seen in a section taken diametrically through the wheel, each of these elements presents parts which are curved in opposite directions. For the purpose of taking-up forces which act substantially radially between the wheel center and the region of the wheel in contact with the underlying surface when the wheel is subjected to load, the elements are elastically yielding in the radial direction of the wheel during increased bending of the elements. The circumferentially spaced and bendable elements are constructed so that both the sum of the bending of each small longitudinal section of the elements when the elements are subjected to load in the radial direction of the wheel and the sum of the product of the bending of each small section and the distance of this section from the underlying surface when the wheel is subjected to normal load is at least essentially zero.

11 Claims, 2 Drawing Sheets

SUPPORTING WHEEL

This invention relates to a non-pneumatic supporting wheel of the kind comprising a central part and a wheel-rim, which is carried by said central part and which has an outer wheel-rim part, which is intended to roll on an underlying surface, and an inner wheel-rim part, located radially inwards of said outer wheel-rim part, wherein at least the inner of the two wheel-rim parts is constructed from a plurality of curved elongated elements which consist of a resilient material and which are mutually separated in the circumferential direction of the wheel, and wherein each of said elongated elements, when seen in a section taken diametrically through the wheel, present parts which are curved in opposite directions, and which elements, for the purpose of taking-up forces which, when the wheel is subjected to load, act substantially radially between center of the wheel and the region thereof in contact with the underlying surface, are elastically yielding in the radial direction of said wheel during increased bending of said elements.

In the case of known non-pneumatic support wheels, see for instance U.S. patent application No. 2,436,844 and 4,350,196 and WO 87/05268, the outer wheel-rim part tends to move to one side upon contact with the underlying surface. This can result in drawbacks in the form of increased wear on the material which comes into contact with the underlying surface, increased stresses on wheel bearings, impaired road holding of a vehicle which is fitted with such non-pneumatic supporting wheels, and, above all, higher internal losses as a result of propagation of the lateral movements of that wheel-rim region in contact with the underlying surface to adjacent regions of the wheel and resultant deformation of said regions.

The object of the present invention is to provide a novel and useful supporting wheel in which the aforesaid drawbacks are at least substantially avoided.

To this end, it is proposed in accordance with the invention that in the case of a supporting wheel of the kind described in the introduction, the bendable elements which are mutually spaced in the circumferential direction of the wheel are so constructed that both the sum of the bending of each small longitudinal section of the elements when said elements are subjected to load in the radial direction of the wheel, and the sum of the product of the bending of each such small section and the distance of this section from the underlying surface when the wheel is subjected to normal load is at least substantially zero. As a result of this arrangement, the supporting wheel will be deformed elastically substantially only in the radial direction when in contact with the underlying surface.

The aforedescribed, inventive construction of the elongated resilient elements can be achieved in many different ways in practice. However, a preferred embodiment of the invention is characterized in that the elements or the parts thereof which form the inner wheel-rim part of said wheel have, when seen in a section taken diametrically through the wheel, essentially the form or a recumbent S with the end of a radially outward convex part being located on one side of the wheel and connected to the central part of said wheel, and the end of a radially inward convex part being connected to the outer wheel-rim part on the opposite side of said wheel.

When the outer wheel-rim part has the form of a circumferentially extending web, it is particularly advantageous to provide the web with radially through-passing holes. These holes, which extend through the outer wheel-rim part, have surprisingly been found to reduce the level of noise that is generated when the supporting wheel rolls against the underlying surface. It has been possible to achieve noise reductions as high as 10 dBA, with a suitable choice of hole size and shape.

The invention will now be described in more detail with reference to the accompanying drawings.

Figure 1:
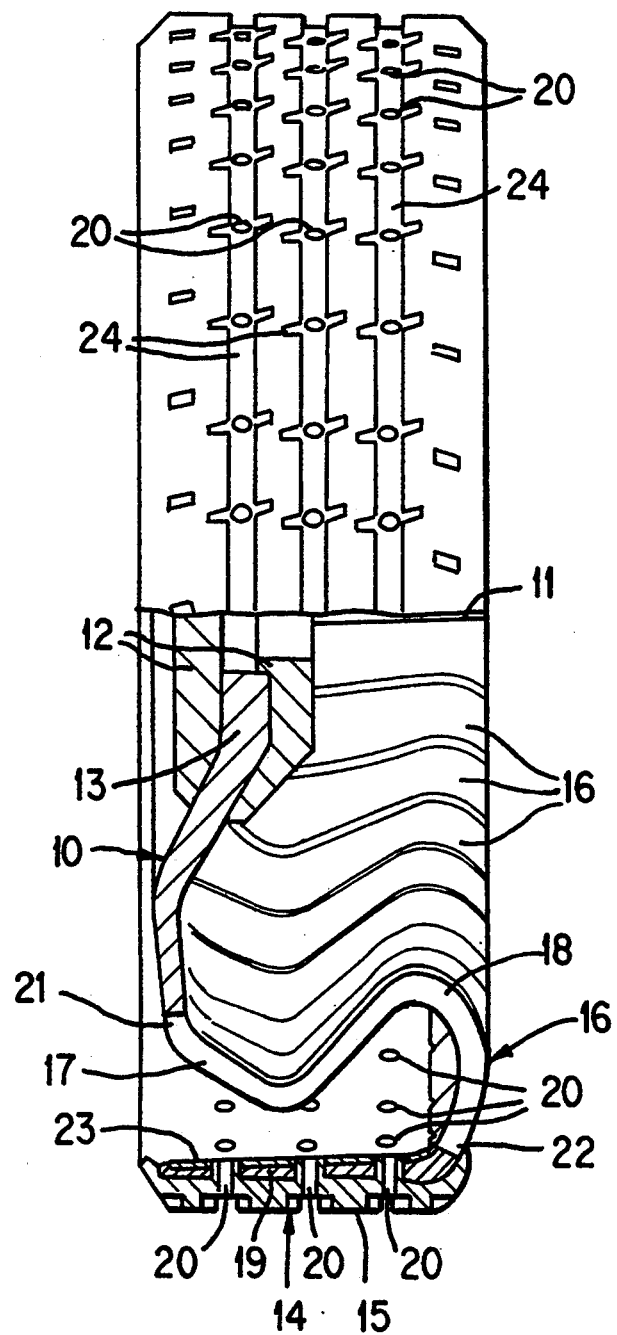
FIG. 1 is a schematic axial-section partial view of an inventive non-pneumatic supporting wheel, with the wheel shown in a load-free state.

In the drawings, the reference numeral 10 identifies generally a central part of a non-pneumatic supporting wheel, for instance the wheel of an automotive vehicle, whose geometric axis is referenced 11. The central part 10 comprises two discs 12, which may be provided with holes (not shown) by means of which the wheel can be fitted, for instance, to a wheel hub, and a disc 13 which is held between the discs 12. The wheel also includes a wheel-rim which is carried by the part 10 and which has an outer, circumferentially extending wheel-rim part 14, having an outer surface tread layer 15 made, for instance, of rubber or plastic material and intended for contact with the underlying surface, or rolling surface, and an inner wheel-rim part which is comprised of a plurality of elongated, curved elements 16. These elements 16, the inner ends of which connect with the disc 13, are mutually spaced in the circumferential direction of the wheel and, when seen in a section taken diametrically through the wheel, present, in the manner shown, oppositely curved parts 17, 18, which are located on respective sides of an imaginary plane extending through the loading center CL (FIGS. 2 and 3), this plane extending through the wheel at right angles to the axis 11 at a location. In a normal case, this location lies midway between the opposite sides of the wheel and the opposite sides of the outer surface tread layer 15 in contact with the underlying rolling surface respectively. When the wheel is subjected to load, forces act substantially radially between the center 11 of the wheel and that region of the outer layer which is in contact with the underlying surface. An essential part of these forces is taken-up by the elements 16 as bending of the curved parts 17, 18 increases. The resilient elements 16 have been constructed in a manner to fulfill the following two conditions simultaneously, by appropriate selection of the material from which said elements are made coupled with suitable selection of their dimensions and shapes, these conditions being:

a) that the sum of the extent to which each small longitudinal section $\Delta 1_k$, $\Delta 1_m$, $\Delta 1_j$, $\Delta 1_n$ of the elements 16 bends when the elements are subjected to load (within the intended wheel loading range) is zero or at least substantially zero; and b) that the sum of the product of the extent to which each such small section $\Delta 1_j$, $\Delta 1_n$ bends and the distance $h_j$, $h_n$ of this section from the underlying surface is zero or at least substantially zero.

Figure 2:
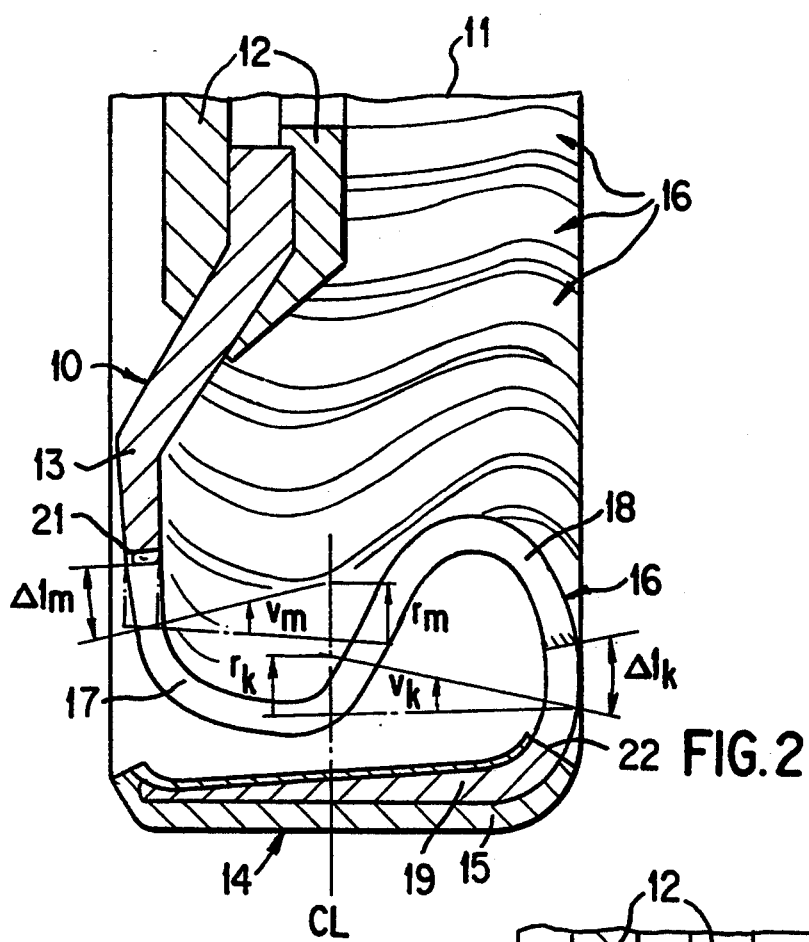
FIGS. 2 and 3 are simplified axial-section partial views of a non-pneumatic supporting wheel similar to the wheel of FIG. 1 and illustrate the principles of the invention, said wheel being shown in a loaded state in said Figures.

The condition a) is illustrated (greatly exaggerated for the sake of clarity) with the loaded wheel shown in FIG. 2, where a force or a load acting-on the outer surface tread layer 15 in the region of its contact with the underlying surface is assumed to be evenly distributed over the whole width of the contact region and has a force resultant which acts in the load center CL perpendicularly to the underlying surface. The load exerted on the wheel causes each small piece or section $\Delta 1_k$, $\Delta 1_m$ of the curved elements 16 concerned to bend from a load-free state, shown in broken lines, through an additional angle of curvature $v_k$, $v_m$ to the loaded state illustrated in full lines. This additional angular value is, of course, contingent on the size of the load. This further bending $v_k$ of the elements 16 on one side of the load center CL will therewith cause the outer wheel-rim part to be obliquely positioned in one direction as this wheel-rim part moves inwardly through a distance which, in the CL-plane, has the length $r_k$, whereas the further bending $v_m$ of the element 16 on the other side of the load center CL will cause the outer wheel-rim part to be positioned obliquely rearwards in the other direction, as this part moves inwards through a distance which, in the CL-plane, has the length $r_m$. The sections $\Delta 1_k$ and $\Delta 1_m$ are representative of other small length sections of the elements 16 on one or the other side respectively of the load center CL. The result of the directive or condition a) is thus that the outer wheel-rim part will retain its parallelity with the underlying surface in the region of its contact with said surface, with the load uniformly distributed over the whole width of the wheel during radial movement. The condition a), however, does not exclude lateral movement of the region of the outer wheel-rim part in contact with the underlying surface relative to adjacent regions of this wheel-rim part, and consequently the condition b) is prescribed in order to rectify this. The condition b) is illustrated (greatly exaggerated for the sake of clarity) with a loaded wheel in FIG. 3, where a force or load acting on the outer surface tread layer 15 in the region of its contact with the underlying surface is assumed to be uniformly distributed over the width of the wheel and to have a force resultant which acts in load center CL perpendicularly to the underlying surface. The load causes each small piece or section $\Delta 1_j$, $\Delta 1_n$ of the curved element 16 concerned to bend through a further angle $v_j$, $v_n$, from a non-loaded state, shown in broken lines, to a loaded state shown in full lines. The size of this further angle is, of course, contingent on the size of the load. This further bending $v_j$ of the section $\Delta 1_j$ of the element 16 on one side of the load center CL will therewith attempt to move the outer wheel-rim part laterally in one direction through a distance $a_j$ whose length is contingent on the product of the further bending $v_j$ and the distance $h_j$ of the section $\Delta 1_j$ from the underlying surface, whereas the further bending $v_n$ of the section $\Delta 1_n$ of the element 16 on the opposite side of the load center CL will strive to move the outer wheel-rim part laterally, back in the opposite direction through a distance $a_n$, whose length is contingent on the product of the further bending $v_n$ of this section $\Delta 1_n$ and the distance $h_n$ of said section from the underlying surface. The sections $\Delta 1_j$ and $\Delta 1_n$ are representative of remaining small length-sections of the element 16 located on one and the other side of the load center CL respectively. Thus, the result of condition b) is that the outer wheel-rim part will not be moved laterally in the region of its contact with the underlying surface, and consequently the result of condition b) in combination with the result of condition a) will result in substantially optimal function of the supporting wheel.

Figure 3:
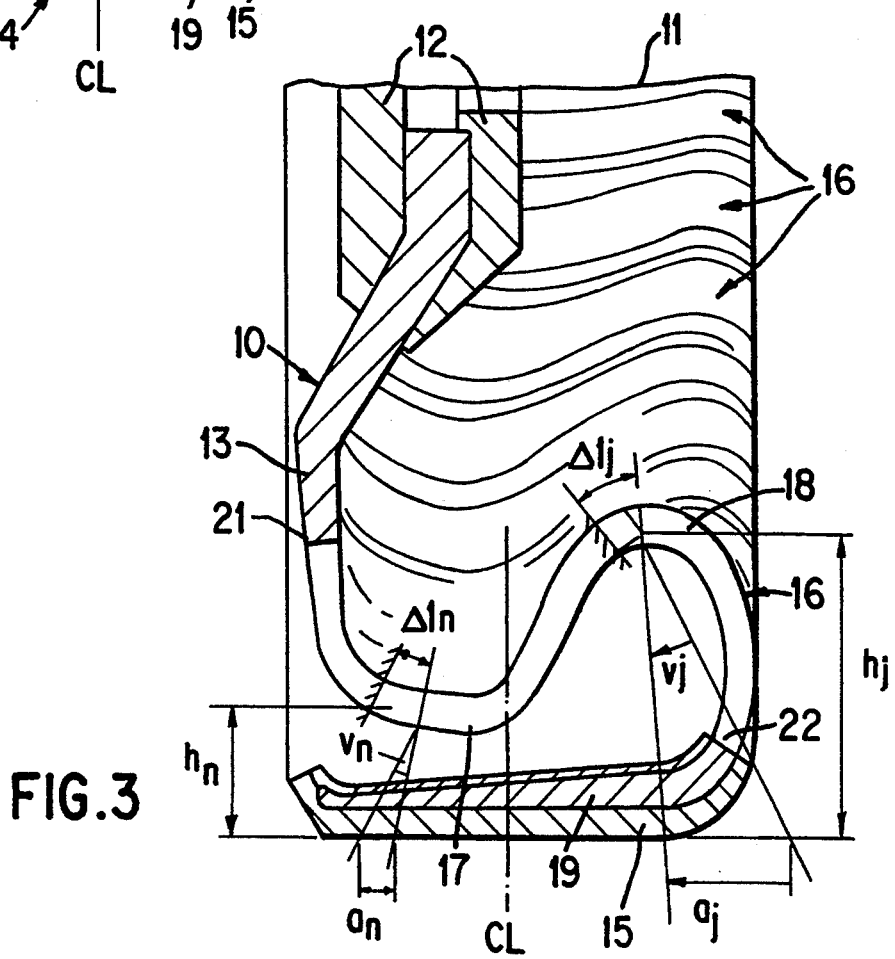

In FIGS. 1–3, the elements 16, when seen in a section taken diametrically through the wheel, have substantially the form of a recumbent S, with the end 21 of a radially outward convex part 17 located on one side of the supporting wheel and adjoining the center part of said wheel, more specifically the adjoining radially outer region of the disc 13, and with the end 22 of a radially inward convex part 18 adjoining the outer wheel-rim part 14, 15 on the opposite side of the wheel. In this way, a relatively small space is required radially for the resilient elements 16. It is also possible, however, to give the resilient elements 16 essentially the form of an upstanding S, with convex, resilient parts located on a first and a second side respectively of said wheel, substantially on opposite sides of the load-center plane CL and at different radial distances from the tread 15, although respect must be paid to the fact that when the resilient elements bend, those parts of the elements 16 which are located far from the underlying surface will cause greater lateral movement of that region of the outer wheel-rim part in contact with the underlying surface than those parts of the elements 16 which are located close to said surface. For example, those parts which are distal from the underlying surface are made more rigid than those parts which are located close to said surface.

The outer, circumferentially extending wheel-rim part 14, and the outer surface tread 15 may advantageously be constructed of radially outer end-parts 19 or continuations of the resilient, elongated, curved elements 16 mutually spaced in the circumferential direction of the wheel, said end parts extending substantially horizontally from the region 22 on one side of the wheel towards and past the CL-plane, to the other side of said wheel. These end parts or continuations 19 may be embedded in the tread material, such as rubber or plastic material, either individually or, as shown, commonly. In the former case, the tread will thus also consist of peripherally separated regions, while in the latter case the tread will extend continuously around the wheel. It is also possible to construct the outer wheel-rim part as a substantially cylindrical ring of resilient material which is clad with tread material and to which the regions 22 of the elements 16 connect. It is also possible to construct the wheel more or less completely from composite material.

At least when the outer wheel-rim part 14, and the layer 15 are in the form of a circumferentially extending, continuous web, it is suitable to form radially through-passing holes 20 in said web, in the manner illustrated, in order to reduce the level of noise that is generated when the wheel runs on the underlying surface. More specifically, the outer wheel-rim part 14, and the layer 15, in accordance with FIG. 1, are provided with rows of through-passing holes 20 which extend completely through both the tread material 15 and the tread-supporting structure 14, so as obtain "ventilation" between the outer surface of the outer wheel-rim part and the radially inwardly facing inner surface 23 of said wheel-rim part. The holes 20 are arranged in pattern cavities 24 in that side of the web or tread intended for contact with the underlying surface. The size, shape and number of the holes 20 used to reduce sound emission can vary from case to case and the holes may also have a cross-sectional area which varies along their respective lengths.

The combined area of the holes 20 should, however, lie between 2 and 50% of the total area of the side of the web or tread intended for contact with the underlying surface. The holes may be from 100 to 1,000 in number and may have a combined hole-area of at least 3%, suitably at least 5% and preferably at least 7% of the area of said web or tread side, and at most 30% and suitably at most 25% of the area of said web side.

An advantage is afforded when at least some of the holes 20 are arranged in the bottom of pattern cavities 24 in the web side intended for contact with the underlying surface, in the manner shown, and holes of different sizes and/or with irregular positioning in the outer wheel-rim part can be used, in order to avoid undesirable resonance phenomena, among other things. The holes may have any desired shape and at least some of the holes may have the form of slots or slits, wherein the holes or the slits may have a diameter or a smallest cross-dimension of 1–20 mm. At least some of the holes 20 on the side 23 of the outer wheel-rim part 14 facing towards the wheel center may open into cavities having a shape and size selected for the absorption of noise within a determined frequency range. Noise reductions as high as 10 dBA have been obtained in practice with hole arrangements of the aforedescribed kind.

The invention is not restricted to the embodiments described above with reference to the drawings, but can be realized in any desired manner within the scope of the inventive concept defined in the following claims.

I claim:

1. A non-pneumatic supporting wheel comprising:
   a central; and
   a wheel-rim, having an inner wheel-rim part and an outer wheel-rim part, carried by said central part, said outer wheel-rim part rolling on an underlying surface and said inner wheel-rim part located radially inwards of the outer wheel-rim part;
   said inner wheel-rim part including a plurality of curved, elongated, bendable elements which consist of a resilient material and are separated from one another in a circumferential direction of the wheel;
   each of said curved, elongated, bendable elements having the shape of a recumbent S so that (a) one end of a radially outwardly convex portion of each of said curved, elongated, bendable elements is located on one side of the wheel and is connected with said central part of the wheel and (b) a remote end of a radially inwardly convex portion of each of said curved, elongated, bendable elements is located on an opposite side of the wheel and is connected with said outer wheel-rim part of said wheel-rim;
   wherein said curved, elongated, bendable elements, in order to take up forces which, when the wheel is subjected to load, act substantially radially between said central part of the wheel and said outer wheel-rim part, are elastically resilient in a radial direction of said wheel during increased bending of said curved, elongated, bendable elements, and wherein said curved, elongated, bendable elements are constructed so that both a sum of each longitudinal bending increment ($\Delta 1_k$, $\Delta 1_m$, $\Delta 1_j$, $\Delta 1_n$) of the curved, elongated, bendable elements and a sum of a product of each longitudinal bending increment ($\Delta 1_j$, $\Delta 1_n$) and a distance ($h_j$, $h_n$) between each longitudinal bending increment, respectively, and the underlying surface is zero when the wheel is subjected to normal load in the radial direction.

2. A supporting wheel according to claim 1, wherein the curved, elongated, bendable elements all include radially outer end parts so that the outer wheel-rim part is formed at least partially by said radially outer end parts of the curved, elongated, bendable elements.

3. A supporting wheel according to claim 2, wherein the radially outer end parts of the curved, elongated, bendable elements are embedded in at least one of a rubber and a plastic material intended for contact with the underlying surface.

4. A supporting wheel according to claim 1, wherein the outer wheel-rim part is a circumferentially extending web provided with between 100 and 1000 radially through-passing holes.

5. A supporting wheel according to claim 4, wherein a combined area of the through-passing holes is between 5 and 30% of a total area of the material intended for contact with the underlying surface.

6. A supporting wheel according to claim 4, wherein the outer wheel-rim part includes pattern cavities provided therein and at least some of the through-passing holes are arranged in bottoms of said pattern cavities.

7. A supporting wheel according to claim 4, wherein the through-passing holes have different sizes.

8. A supporting wheel according to claim 7, wherein the through-passing holes are irregularly positioned.

9. A supporting wheel according to claim 4, wherein at least some of the through-passing holes open out towards the central part of said wheel into cavities having shapes and sizes which are selected to promote absorption of noise within a determined frequency range.

10. A supporting wheel according to claim 4, wherein the through-passing holes have a smallest cross-dimension of 1–20 mm and at least some of the through-passing holes are formed as slits.

11. A supporting wheel according to claim 4, wherein the through-passing holes are irregularly positioned.

* * * * *